(12) United States Patent
Konrad et al.

(10) Patent No.: US 11,794,637 B2
(45) Date of Patent: Oct. 24, 2023

(54) ILLUMINATING A VEHICLE DOOR GAP TO SUPPORT THE OPERABILITY OF AUTOMATIC DOOR OPENING SYSTEMS

(71) Applicant: DAIMLER AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 143 days.

(21) Appl. No.: 17/596,447

(22) PCT Filed: May 8, 2020

(86) PCT No.: PCT/EP2020/062807
§ 371 (c)(1),
(2) Date: Dec. 10, 2021

(87) PCT Pub. No.: WO2020/249333
PCT Pub. Date: Dec. 17, 2020

(65) Prior Publication Data
US 2022/0307287 A1 Sep. 29, 2022

(30) Foreign Application Priority Data
Jun. 13, 2019 (DE) ...................... 10 2019 004 209.3

(51) Int. Cl.
*B60Q 1/26* (2006.01)
*B60Q 1/32* (2006.01)
(Continued)

(52) U.S. Cl.
CPC ........... *B60Q 1/2669* (2013.01); *B60Q 1/324* (2022.05); *E05B 17/10* (2013.01); *E05B 81/20* (2013.01);
(Continued)

(58) Field of Classification Search
CPC ......... E05B 17/10; E05B 81/20; B60Q 1/324; B60Q 81/20; B60Q 2900/40; E05Y 2900/531
(Continued)

(56) References Cited
U.S. PATENT DOCUMENTS
9,227,558 B2 1/2016 Spence et al.
9,469,246 B1 * 10/2016 Gold ...................... B60Q 1/324
(Continued)

FOREIGN PATENT DOCUMENTS
DE 102006035521 A1 2/2008
DE 202009002108 U1 4/2009
(Continued)

OTHER PUBLICATIONS
International Search Report dated Jul. 16, 2020 in related/corresponding International Application No. PCT/EP2020/062807.
(Continued)

Primary Examiner — Laura K Tso
(74) Attorney, Agent, or Firm — PATENT PORTFOLIO BUILDERS PLLC

(57) ABSTRACT

A door system for a vehicle includes a vehicle door, a closing unit, an operating element arranged on the vehicle door for a vehicle user, a first light source, and a control unit. The first light source is arranged such that the first light source illuminates segments of the vehicle door and/or body in the region of the door gap. The control unit receives signals of an electronic key for the vehicle and controls the closing unit depending on signals of the electronic key, and the first light source depending on the closure state of the vehicle door and/or depending on a communication state of the electronic key with the control unit of the vehicle. For a defined closure state of the vehicle door or a defined communication state of the electronic key with the control
(Continued)

Figure 1:
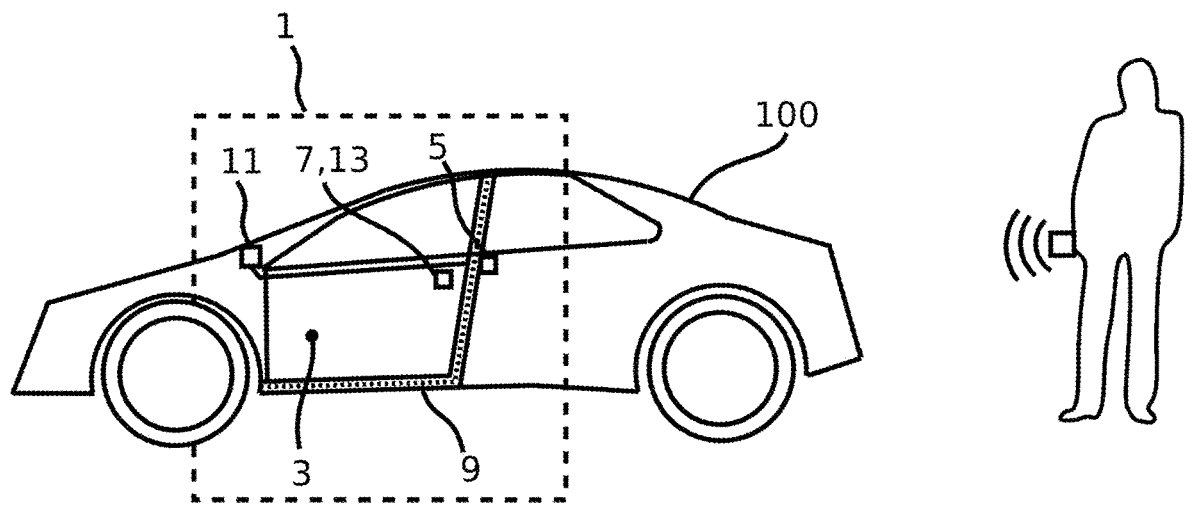

unit, the control unit illuminates a location of the segments of the vehicle door assigned to the operating element and/or the segments of the body.

9 Claims, 2 Drawing Sheets

(51) Int. Cl.
    *E05B 17/10*     (2006.01)
    *E05B 81/20*     (2014.01)

(52) U.S. Cl.
    CPC ..... *B60Q 2900/40* (2022.05); *E05Y 2900/531* (2013.01)

(58) Field of Classification Search
    USPC ......................................................... 362/501
    See application file for complete search history.

(56) References Cited

U.S. PATENT DOCUMENTS

| | | | |
|---|---|---|---|
| 2009/0051517 A1* | 2/2009 | Suzuki | F21S 4/20 |
| | | | 362/545 |
| 2012/0106182 A1 | 5/2012 | Minter et al. | |
| 2015/0002288 A1* | 1/2015 | Lee | B60Q 1/46 |
| | | | 340/471 |
| 2015/0138818 A1* | 5/2015 | Salter | B60Q 3/68 |
| | | | 362/546 |
| 2017/0028795 A1 | 2/2017 | Schlaupitz | |
| 2019/0024421 A1 | 1/2019 | Cumbo | |
| 2020/0172002 A1* | 6/2020 | Kothe | E05B 17/10 |

FOREIGN PATENT DOCUMENTS

| | | |
|---|---|---|
| DE | 102011106318 A1 | 1/2013 |
| DE | 202013104594 U1 | 11/2013 |
| DE | 102014100144 A1 | 7/2014 |
| DE | 102014017775 A1 | 1/2016 |
| DE | 102016200393 A1 | 8/2016 |
| DE | 102016113753 A1 | 2/2017 |
| DE | 102018008212 A1 | 12/2019 |
| DE | 102018005763 A1 | 1/2020 |
| EP | 3398814 A1 | 11/2018 |

OTHER PUBLICATIONS

Office Action dated Dec. 13, 2019 in related/corresponding DE Application No. 10 2019 004 209.3.
Written Opinion dated Jul. 16, 2020 in related/corresponding International Application No. PCT/EP2020/062807.

* cited by examiner

ILLUMINATING A VEHICLE DOOR GAP TO SUPPORT THE OPERABILITY OF AUTOMATIC DOOR OPENING SYSTEMS

BACKGROUND AND SUMMARY OF THE INVENTION

Exemplary embodiments of the invention relate to a door system for a vehicle, in particular with a first light source, and a method for emission of a light signal by a first light source of a door system of a vehicle.

In the prior art it is known to automatically unlock and lock a vehicle when a vehicle user approaches. It is therefore no longer necessary for the driver to operate a button on a key for the vehicle. With this so-called "keyless go" system, a transponder is detected from the vehicle. The opening of one or all doors of the vehicle takes place, in particular, when the driver carries a corresponding identifiable transponder and approaches so closely to the vehicle that the range of the transponder is sufficient to establish data transfer between a control unit of the vehicle and the transponder. After exchange and verification of access authorization, in particular the position of the mobile transponder is located continuously, for example by means of so-called "polling" or triangulation.

In this context, DE 10 2018 005 763 relates to a method for operating a functional unit of a motor vehicle by means of an identification system, with which, in particular for operating the functional unit, at least one first authentication with the identification system is requested. Moreover, by means of a mobile identification element, an identification signal as authentication is transmitted to an identification device, and after the identification signal has been received, the functional unit is operated.

If a vehicle door is unlocked by the control unit of the vehicle, the vehicle door may additionally be brought, by means of a servo system, into a predefined position, and in particular be opened slightly. Concerning this aspect, DE 10 2018 008 212 relates to a door-lock arrangement of a vehicle door, wherein the door-lock arrangement has, in particular, an impact element connected to an actuator for automatic opening of the vehicle door up to a limiting opening angle relative to the body of the vehicle.

US 2012/0106182 A discloses a door handle for a vehicle in which a light source is arranged within the door handle. The light source is controllable depending on a state of closure of the respective door.

DE 10 2014 100 144 A1 discloses a vehicle door in which an illumination system emits light as a reaction to received signals of a portable transmitting device, which indicates the status of a lock of the vehicle door.

DE 10 2006 035 521 A1 discloses a motor vehicle comprising a lighting device integrated in the side paneling of a side door, for illuminating a region near the door outside of the vehicle on opening the side door, wherein the lighting device has several light sources arranged along the side paneling.

DE 10 2014 017 775 A1 discloses a lighting device for a vehicle body having a lighting element, which is arranged in such a way relative to the gap that light emanating from a light-exit surface of the lighting element exits from the gap.

Especially when such a system is advantageously used for arranging an operating element for the vehicle door projecting less from the vehicle door or body of the vehicle, the operating element is more difficult for the driver to find and sometimes is less intuitive in operation. Unlike in manual unlocking of a vehicle, with the aforementioned automatic systems, not every action of the door system correlates with an action on the part of the vehicle user. This could leave the vehicle user unclear about the state of the door system. Therefore, exemplary embodiments of the invention are directed to improving the operability of such a door system for a vehicle door and make it more convenient for the user.

A first aspect of the invention relates to a door system for a vehicle, having a vehicle door, a closing unit for setting a closure state of the vehicle door, an operating element arranged on the vehicle door for a vehicle user, a first light source, and a control unit of the vehicle connected to the closing unit and to the first light source, wherein the first light source is arranged in such a way that the first light source illuminates segments of the vehicle door and/or segments of the body in the region of the door gap between the vehicle door and the body, wherein the control unit is configured for receiving signals of an electronic key for the vehicle and for controlling the closing unit as a function of the signals of the electronic key, and for controlling the first light source depending on the closure state of the vehicle door and/or depending on a communication state of the electronic key with the control unit of the vehicle.

The vehicle is preferably a passenger car, a lorry, a bus, an agricultural machine, a construction-site vehicle, a (rail) coach of a train, or an emergency vehicle.

The first light source may on the one hand be an individual logical light source, wherein the segments of the vehicle door to be illuminated and/or the segments of the body to be illuminated takes place by distribution of the light of the first light source preferably by light guides, on the other hand the first light source may be assembled from several individual sources. In the latter case the first light source comprises, in particular, a plurality of light source elements, preferably LED elements, which furthermore are preferably arranged behind a transparent diffusing element, to ensure a uniform emission characteristic of the light source elements. The first light source may be arranged on the vehicle door itself, or also on the body of the vehicle. Preferably the first light source is arranged directly in the contact region of the vehicle door with the body itself. Also preferably, first light source elements of the first light source are arranged on the vehicle door itself, second light source elements of the first light source are arranged on the body of the vehicle. In each case the light source elements of the first light source are arranged in such a way that the vehicle door can be illuminated at least in sections in the region of the door gap relative to the body.

The control unit of the vehicle is not necessarily arranged on the vehicle door itself or in the region of the vehicle door on the body of the vehicle; the control unit may also be a central control unit of the vehicle.

The operating element is preferably connected to the closing unit, but may also further preferably be connected directly to the control unit. The operating element serves, in particular, to unlock the vehicle door and change it to a freely movable state. In contrast, the closing unit serves, in particular, for setting the closure state, that is, to lock the vehicle door or unblock it from the body. The operating element is further preferably connected to the control unit, so that the control unit can determine a state of the operating element and, based on the determined state of the operating element, can control the first light source correspondingly.

The electronic key is in particular configured for transmitting, by radio transmission, signals to the control unit of the vehicle, so that on mere approach of a vehicle user to the vehicle, the control unit controls the closing unit for setting the closure state of the vehicle door. The closure state of the vehicle door relates in particular to a state of a vehicle lock, i.e., whether the vehicle door is locked or unlocked, and furthermore in particular an opening state of the vehicle door. Furthermore, the control unit of the vehicle is preferably connected to an actuator, so that as the vehicle user approaches the vehicle, the control unit not only controls a door lock for unlocking, but also the actuator for initial opening of the vehicle door relative to the body of the vehicle by an initial limiting opening angle.

The communication state of the electronic key with the control unit of the vehicle further relates, in particular, to whether the electronic key communicates with the control unit at all, which, in particular, is the case when the electronic key is located within a specified radius around the control unit or around a receiving unit of the control unit, and in particular also when the electronic key communicates at least unidirectionally with the control unit.

An advantageous effect of the invention is that the vehicle user is informed intuitively of a locked state and/or an open state of the vehicle door, so that, in particular, also in the case of an actuator-supported initial opening of the vehicle door, the vehicle user can easily identify the opening state of the vehicle door. Advantageously, this makes operation of the vehicle door easier, in particular if the vehicle is equipped with an automatic door system as presented above.

According to an advantageous embodiment, the control unit is configured for controlling the first light source for at least one specified closure state of the vehicle door or a specified communication state of the electronic key with the control unit for illuminating a location of the segments of the vehicle door and/or of the segments of the body assigned to the operating element. In particular, in the case of operating elements on a vehicle door, which are arranged rather discreetly and inconspicuously on the vehicle door, the vehicle user is led intuitively by corresponding illumination to the operating element and can find and operate this without a lengthy search, even in the case of automatic unlocking by a control unit of the vehicle.

According to an advantageous embodiment, the first light source is arranged in such a way that an emission region of the first light source reaches the segments to be illuminated of the vehicle door and/or the illuminated segments of the body, so that only the reflection of the light emitted by the first light source on the vehicle door or on the body can be seen by a vehicle user. Advantageously, this ensures that other road users never look directly into the first light source and could be dazzled as a result. Furthermore, advantageously this embodiment allows uniform illumination on the respective segments of the vehicle door or of the body.

According to a further advantageous embodiment, the control unit is configured for controlling the first light source for emitting a brightness variation with a temporally variable brightness maximum over the segments of the vehicle door and/or the segments of the body, so that the brightness maximum travels at a preset speed in the direction of the location of the segments of the vehicle door and/or the segments of the body assigned to the operating element. In particular, an operating element arranged discreetly and inconspicuously on the vehicle door is thus found more easily by the vehicle user. For example, the operating element could be arranged behind a cup or behind a flap.

According to a further advantageous embodiment, the operating element is arranged on an outer side of the vehicle door. The outer side of the vehicle door is, in particular, that part of a surface of the vehicle door that is turned away from the internal space of the vehicle and is turned towards the surroundings of the vehicle.

According to a further advantageous embodiment, the operating element is arranged on a front side of the vehicle door. The front side of the vehicle door is, in particular, that side that is led onto a front end of a column of the body during closing of the vehicle door, so that with the vehicle door closed, the front side of the vehicle door and the front end of the column of the body are arranged in abutment with one another.

According to a further advantageous embodiment, the door system additionally has a second light source, wherein the second light source is arranged in the region of the operating element so that the second light source illuminates the operating element. Preferably the control unit is configured for controlling the first light source and the second light source synchronously with one another. Alternatively, different control of the first light source and of the second light source is possible. The second light source advantageously makes it possible to indicate to the vehicle user the position of the operating element on the vehicle door even more accurately and comfortably.

According to a further advantageous embodiment, the first light source has a plurality of sections, wherein the control unit is configured for controlling the sections of the first light source with different brightness values and/or different color values depending on the closure state of the vehicle door and/or depending on the communication state of the electronic key with the control unit. The various controllable sections of the first light source advantageously make it possible to present a light pattern or color pattern assigned to the respective closure state of the vehicle door and/or the respective communication state of the electronic key with the control unit so that it is identified by the vehicle user as intuitively and unequivocally as possible.

According to a further advantageous embodiment, the control unit is configured for emitting the first light source and/or the second light source when the vehicle door is opened with an opening angle above a predefined limit, to emit a warning light for warning other vehicles approaching the vehicle from behind. The warning light advantageously serves for warning other vehicles approaching from behind when the vehicle door is open, to avoid a collision of the other vehicles with the vehicle door as far as possible.

A further aspect of the invention relates to a vehicle with a door system as described above and hereunder.

A further aspect of the invention relates to a method for emission of a light signal by a first light source of a door system of a vehicle, wherein the door system has a vehicle door, a closing unit for setting a closure state of the vehicle door, an operating element arranged on the vehicle door for a vehicle user, a first light source, and a control unit of the vehicle connected to the closing unit and to the first light source, wherein the first light source is arranged in such a way that the first light source illuminates segments of the vehicle door and/or segments of the body in the region of the door gap between the vehicle door and the body, having the steps:

receiving signals of an electronic key for the vehicle,
controlling the first light source for illuminating segments of the vehicle door and/or segments of the body in the region of the door gap between the vehicle door and the body in a first light mode,
controlling the closing unit for unlocking the vehicle door, and
controlling the first light source for illuminating the segments of the vehicle door and/or the segments of the body in the region of the door gap between the vehicle door and the body in a second light mode.

Advantages and preferred developments of the proposed method follow from analogous and corresponding application of the embodiments presented above in connection with the proposed door system.

Further advantages, features and details follow from the description given hereunder, in which—referring to the drawing if necessary—at least one embodiment example is described in detail. Identical, similar and/or functionally equivalent parts are given the same reference symbol.

BRIEF DESCRIPTION OF THE DRAWING FIGURES

Figure 2:
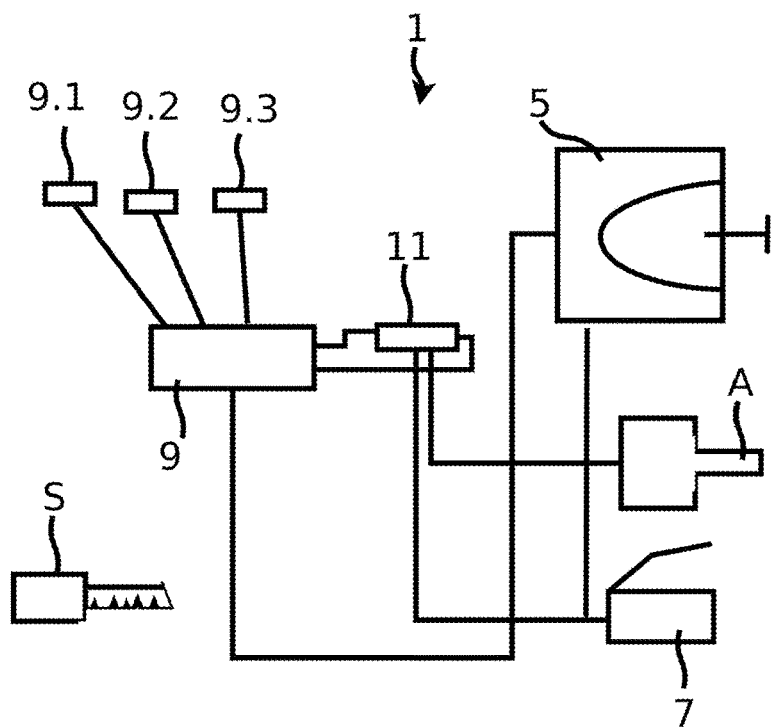
Figure 3:
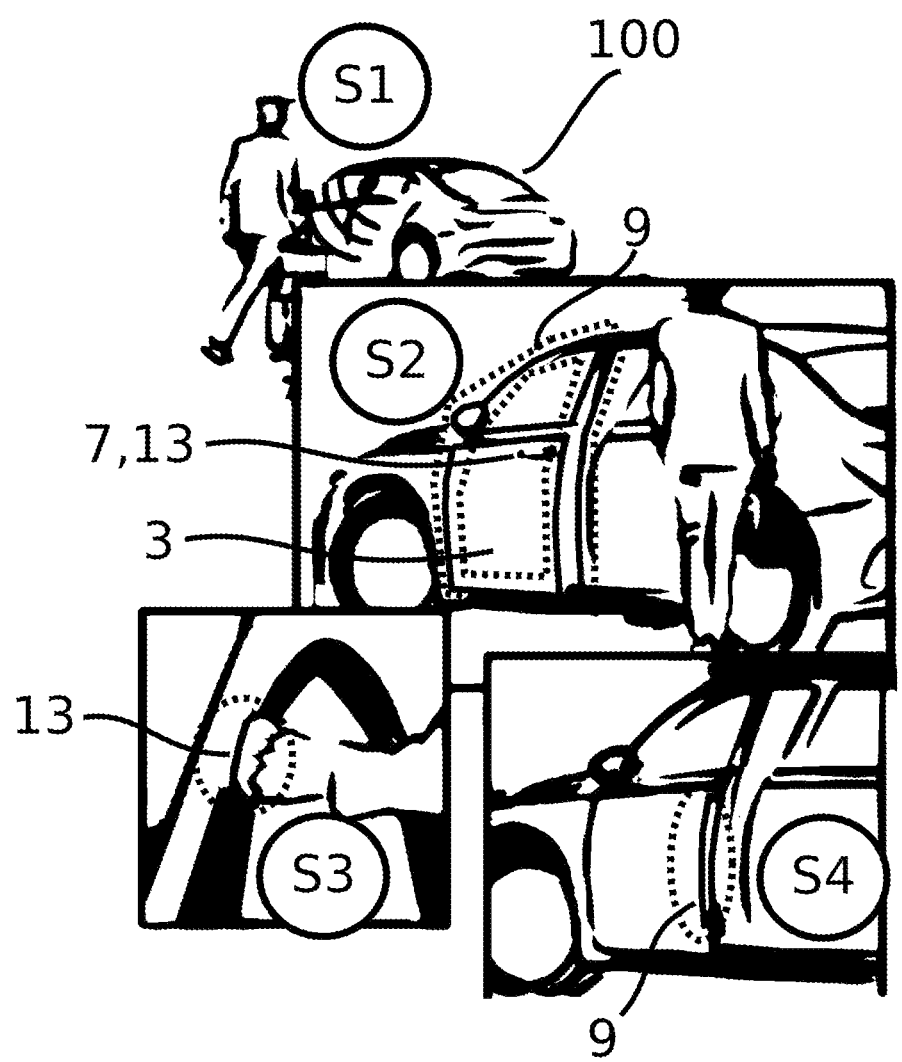

The figures show:

FIG. 1 a vehicle with a door system according to an embodiment example of the invention, FIG. 2 details of a door system according to a further embodiment example of the invention, and FIG. 3 a method for emission of a light signal by a first light source of a door system according to a further embodiment example of the invention.

The figures are schematic and are not to scale.

DETAILED DESCRIPTION

FIG. 1 shows a vehicle 100 with a door system 1. The door system 1 has a vehicle door 3 and a closing unit 5 for setting a closure state, i.e., for locking and unlocking the vehicle door 3. The door system 1 also has an operating element 7 arranged on the outer side of the vehicle door 3, for a vehicle user. The operating element 7 is configured as a door handle and is arranged under a cup. A first light source 9 of the door system 1 is arranged in such a way that the first light source 9 in each case illuminates, with diffuse light, segments of the vehicle door 3 and segments of the body in the region of the door gap between the vehicle door 3 and the body. For this purpose, the first light source 9 has a plurality of LED elements, which are arranged on a front side of the vehicle door 3. An emission direction of the respective LED elements then shows tangentially to the front end to the vehicle door 3, so that a following vehicle or other road user does not look directly at the LED elements themselves, but always only sees the reflection of the LED elements on the front side of the vehicle door 3 as well as on the body of the vehicle 100. The reflection produces a diffuse light in the door gap between the front side of the vehicle door 3 and the body of the vehicle 100.

Furthermore, the door system 1 has a control unit 11 connected to the closing unit 5 and to the first light source 9. This control unit 11 can, by means of a receiving module, receive signals of an electronic key for the vehicle 100 and controls the closing unit 5 on receiving signals per se or particular signals. Moreover, the control unit 11, correlating therewith, controls the first light source 9, i.e., depending on the closure state of the vehicle door 3 and depending on a communication state of the electronic key with the control unit 11.

The door system 1 also has a second light source 13, wherein the second light source 13 is arranged in the region of the operating element 7 in such a way that the second light source 11 illuminates the operating element 7. If the control unit 11 has controlled the closing unit 5 for unlocking a lock of the vehicle door 3, it also controls the first light source 9 for illuminating a location of the segments of the vehicle door 3 assigned to the operating element 7 and the segments of the body, and controls the second light source 13 synchronously therewith. Details of a possible topology of such a door system 1 are shown in FIG. 2. Moreover, the control unit 11 controls the first light source 9 and the second light source 13, when the vehicle door 3 is opened with an opening angle above a predefined limit, for emitting a warning light for warning other vehicles approaching the vehicle 100 from behind.

FIG. 2 shows a possible logic structure of a door system 1. In this case the closing unit 5 has a lock mouth and a catching eyelet, wherein the operating element 7 configured as a door handle is connected mechanically to the closing unit 5. When the control unit 11 receives a corresponding signal of the electronic key S, the control unit 11 controls the closing unit 5 for unlocking the lock located in the closing unit 5, so that through actuation of the operating element 7 configured as a door handle by the vehicle user, the vehicle door 3 can be opened through an angle. An actuator A is controlled by the control unit 11 for initial opening of the vehicle door 3 by a preset opening angle, which in particular in the case of icing of the vehicle door 3, facilitates opening of the vehicle door 3 by the vehicle user. If the control unit 11 has controlled the closing unit 5 for unlocking a lock of the vehicle door 3, it also controls the first light source 9 for illuminating a location of the segments of the vehicle door 3 assigned to the operating element 7 and the segments of the body. For this purpose, the first light source 9 has a plurality of sections, wherein the control unit 11 controls the sections of the first light source 9 with different brightness values and different color values depending on the closure state of the vehicle door 3 and depending on the communication state of the electronic key S with the control unit 11. The sections of the first light source 9 are referenced 9.1, 9.2 and 9.3 in FIG. 2. The control unit 11 then controls the first light source 9 to emit a brightness variation with a temporally variable brightness maximum over the segments of the vehicle door 3 and the segments of the body, in such a way that the brightness maximum runs at a predetermined speed in the direction of the location of the segments of the vehicle door 3 assigned to the operating element 7 and the segments of the body.

FIG. 3 shows a method for emission of a light signal by a first light source 9 of a door system 1 of a vehicle 100, wherein the door system 1 has a vehicle door 3, a closing unit 5 for setting a closure state of the vehicle door 3, an operating element 7 arranged on the vehicle door 3 for a vehicle user, a first light source 9, and a control unit 11 connected to the closing unit 5 and to the first light source 9 of the vehicle 100, wherein the first light source 9 is arranged in such a way that the first light source 9 illuminates segments of the vehicle door 3 and/or segments of the body in the region of the door gap between the vehicle door 3 and the body. The method has the following steps, wherein in FIG. 3 the illuminated areas of the door system 1 are marked with dashed borders:

receiving S1 signals of an electronic key for the vehicle 100, controlling S2 the first light source 9 for illuminating segments of the vehicle door 3 and segments of the body in the region of the door gap between the vehicle door 3 and the body in a first light mode and controlling the second light source 13 by the control unit 11, wherein a surrounding region of a door gap and a door mirror of the vehicle are illuminated, controlling S3 the closing unit 5 for unlocking the vehicle door 3 while the operating element 7 is illuminated by the second light source 13, and controlling S4 the first light source for illuminating the segments of the vehicle door 3 and the segments of the body in the region of the door gap between the vehicle door 3 and the body in a second light mode, wherein the second light mode is a warning light for warning other vehicles approaching the vehicle (100) from behind and the warning light is arranged in a lower segment of the front side of the vehicle door 3.

Although the invention has been illustrated and explained in detail with preferred embodiment examples, the invention is not limited by the examples disclosed, and other variations can be derived from these by a person skilled in the art, while remaining within the scope of protection of the invention. It is therefore clear that a large number of possible variations exist. It is also clear that embodiments given as examples really only represent examples, which are not to be construed in any way as a limitation of the range of protection, the possible uses or the configuration of the invention. Rather, the foregoing description and the description of the figures make a person skilled in the art able to apply the embodiment examples concretely, wherein a person skilled in the art, in the knowledge of the disclosed inventive idea, can make various changes, for example with respect to the function or the arrangement of individual elements stated in an embodiment example, while remaining within the scope of protection, which is defined by the claims and legal equivalents thereof, such as more extensive explanations in the description.

The invention claimed is:

1. A door system for a vehicle, the door system comprising:
    a vehicle door;
    a closing unit configured to set a closure state of the vehicle door;
    an operating element arranged on the vehicle door for a vehicle user;
    a first light source; and
    a control unit of the vehicle connected to the closing unit and to the first light source,
    wherein the first light source is arranged in such a way that the first light source illuminates segments of the vehicle door or segments of a body of the vehicle in a region of a door gap between the vehicle door and the body,
    wherein the control unit is configured to receive signals of an electronic key for the vehicle and to control the closing unit depending on the signals of the electronic key, and to control the first light source depending on the closure state of the vehicle door or depending on a communication state of the electronic key with the control unit of the vehicle, and
    wherein the first light source has a plurality of sections, wherein the control unit is configured to control the plurality of sections of the first light source with different brightness values or different color values depending on the closure state of the vehicle door or depending on the communication state of the electronic key with the control unit.

2. The door system of claim 1, wherein the control unit is configured to controlling the first light source, for at least one determined closure state of the vehicle door or a determined communication state of the electronic key with the control unit, to illuminate a location of the segments of the vehicle door assigned to the operating element or the segments of the body.

3. The door system of claim 2, wherein the control unit is configured to control the first light source to emit a brightness variation with a temporally variable brightness maximum over the segments of the vehicle door or the segments of the body in the region of the door gap between the vehicle door and the body, so that the temporally variable brightness maximum runs at a predetermined speed in a direction of a location of the segments of the vehicle door assigned to the operating element or the segments of the body in the region of the door gap between the vehicle door and the body.

4. The door system of claim 1, wherein the operating element is arranged on an outer side of the vehicle door.

5. The door system of claim 4, wherein the vehicle door has a front side and the operating element is arranged on the front side of the vehicle door.

6. The door system of claim 1, further comprising:
    a second light source, wherein the second light source is arranged in a region of the operating element in such a way that the second light source illuminates the operating element.

7. The door system of claim 6, wherein the control unit is configured to control the first light source or the second light source, with the vehicle door opened with an opening angle above a predefined limit, to emit a warning light for warning other vehicles approaching the vehicle from behind.

8. A vehicle, comprising:
    a body; and
    a door system, which comprises
        a vehicle door;
        a closing unit configured to set a closure state of the vehicle door;
        an operating element arranged on the vehicle door for a vehicle user;
        a first light source; and
        a control unit of the vehicle connected to the closing unit and to the first light source,
    wherein the first light source is arranged in such a way that the first light source illuminates segments of the vehicle door or segments of the body in a region of a door gap between the vehicle door and the body,
    wherein the control unit is configured to receive signals of an electronic key for the vehicle and to control the closing unit depending on the signals of the electronic key, and to control the first light source depending on the closure state of the vehicle door or depending on a communication state of the electronic key with the control unit of the vehicle, and
    wherein the first light source has a plurality of sections, wherein the control unit is configured to control the plurality of sections of the first light source with different brightness values or different color values depending on the closure state of the vehicle door or depending on the communication state of the electronic key with the control unit.

9. A method, comprising:
    receiving, by a vehicle, signals of an electronic key for the vehicle;
    controlling, responsive to receipt of the signals of the electronic key and in a first light mode, a first light source to illuminate segments of vehicle door of the vehicle or segments of a body of the vehicle in a region of a door gap between the vehicle door and the body of the vehicle, wherein the first light source has a plurality of sections;
    controlling, responsive to receipt of the signals of the electronic key, a closing unit of the vehicle to unlock and actuate initial opening of the vehicle door; and
    controlling, in a second light mode, the first light source to illuminate the segments of the vehicle door or the segments of the body in the region of the door gap between the vehicle door and the body of the vehicle by controlling the plurality of sections of the first light source with different brightness values or different color values depending on the closure state of the vehicle door or depending on the communication state of the electronic key with the control unit.

* * * * *